United States Patent [19]
Doumit

[11] 3,956,579
[45] May 11, 1976

[54] PROGRAM SCHEDULE DISPLAYING SYSTEM

[75] Inventor: Joseph A. Doumit, New Iberia, La.

[73] Assignee: Dial-A-Channel, Inc.(Entire), Delcambre, La.

[22] Filed: Aug. 20, 1974

[21] Appl. No.: 499,019

[52] U.S. Cl. ............................... 178/6; 178/DIG. 1; 178/DIG. 13; 178/DIG. 30; 325/308; 353/94
[51] Int. Cl.[2] .......................................... H04N 5/22
[58] Field of Search ........ 178/6, 7.2, 7.88, DIG. 13, 178/DIG. 1, DIG. 6, DIG. 23, DIG. 28, DIG. 30; 352/133–135; 353/48, 30, 94; 325/308

[56] References Cited
UNITED STATES PATENTS

| | | | |
|---|---|---|---|
| 3,309,163 | 3/1967 | White ................................... | 353/94 |
| 3,475,088 | 10/1969 | Saiia ................................... | 352/133 |
| 3,510,657 | 5/1970 | Mangiaracina et al. ........... | 178/7.88 |
| 3,580,993 | 5/1971 | Sandorf.................................. | 178/6 |
| 3,588,241 | 6/1971 | Broom ................................. | 353/94 |
| 3,594,077 | 7/1971 | Marquis................................ | 353/94 |
| 3,752,919 | 8/1973 | Ourashi et al. ..................... | 178/7.88 |
| 3,814,853 | 6/1974 | Lardeau........................ | 178/DIG. 30 |

OTHER PUBLICATIONS

"The Future of Cable TV," by Archer S. Taylor, IEEE Spectrum, Nov. 1969, pp. 77–81.

Primary Examiner—Robert L. Griffin
Assistant Examiner—Jin F. Ng
Attorney, Agent, or Firm—Clarence A. O'Brien; Harvey B. Jacobson

[57] ABSTRACT

Television programs schedules and visual time information are displayed by projection of composite images from the frames of a film strip and slides respectively displaced in synchronism on a cyclic basis and unidirectionally advanced at the end of each regular program period under control of a timer. During film frame movement, other visual material may be projected from intermediate slides in synchronism with audio message signals.

15 Claims, 7 Drawing Figures

PROGRAM SCHEDULE DISPLAYING SYSTEM

This invention relates generally to the presentation of visual information and more particularly to the presentation of television program schedule information.

Television program schedule information is presently distributed to the public on a weekly and daily basis through printed matter. This method of distributing schedule information has been satisfactory where there are a relatively few television broadcast channels in any particular broadcast region where owners of television receivers have access to daily newspapers or weekly publications. Even so, public inconvenience has arisen because of untimely changes in program schedules resulting in stale or inaccurate printed program schedules which mislead the public as to the actual television program material to be broadcast. Further, public inconvenience often results from printed program schedules being lost or misplaced and the necessity for scrutinizing several pages of program schedules in order to locate an appropriate listing.

It is therefore a primary object of the present invention to provide a new and useful means or method for distributing television program schedule information to the public avoiding all of the aforementioned drawbacks and inconveniences.

The aforementioned object of the present invention will be even more appreciated with the more widespread use of cable television because of the ability of a single broadcast installation to broadcast a larger number of television programs over a larger number of channels than the several independent television broadcasters presently operating in any particular broadcast region. Distribution of television program schedule information by printed publications under the foregoing situation will further inconvenience the public because of the increased complexity of the printed schedule material.

In accordance with the present invention, television program schedule information is broadcast to television receivers in any particular local broadcast zone or region over a special television channel set aside for the purpose. Thus, any person may dial this particular information channel in order to receive program schedule information from which a judgment may be made as to the selection of a regular program channel. The program schedule information is produced for transmission over the information channel by projecting composite images from single frames on a film strip and special opaque masking slides utilizing a film projector and slide projector. The program schedule information may also be presented in conjunction with video and audio messages. The visual information is converted to a video signal by means of a lens system and standard television camera. The information is displayed by showing alternately what is being broadcast at any particular time and what is to be broadcast during the next regular program period. The program schedule information itself is derived from the frames of the film while the slides contain the time information. Audio and video messages are produced alternately during movement of the film between frames by means of additional slides and a synchronized audio tape player. The optical image from the film projector is doused by means of a shutter during film movement while the video message from the slide projector is doused by means of the opaque masking slides containing the image forming word "now" or "next." The forward and reverse film and slide movements associated with the film and slide projectors are controlled by a cyclic sequence controller to advance and reverse movement of the film one frame at a time in synchronism with forward and reverse slide changing operation of the slide projector. Unidirectional advancement of the film and slides at the end of each regular program period such as one half hour, is effected through a timer. Other controls associated with the system of the present invention permit an increase in the amount of program schedule information to be displayed.

The following U.S. patents are related to this invention:

| | | | |
|---|---|---|---|
| 1,552,604 | 9/8/25 | 3,176,311 | 3/30/65 |
| 2,750,444 | 6/12/56 | 2,419,041 | 4/15/47 |
| 3,594,077 | 7/20/71 | 3,309,163 | 4/14/67 |
| 3,288,549 | 11/29/66 | | |

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
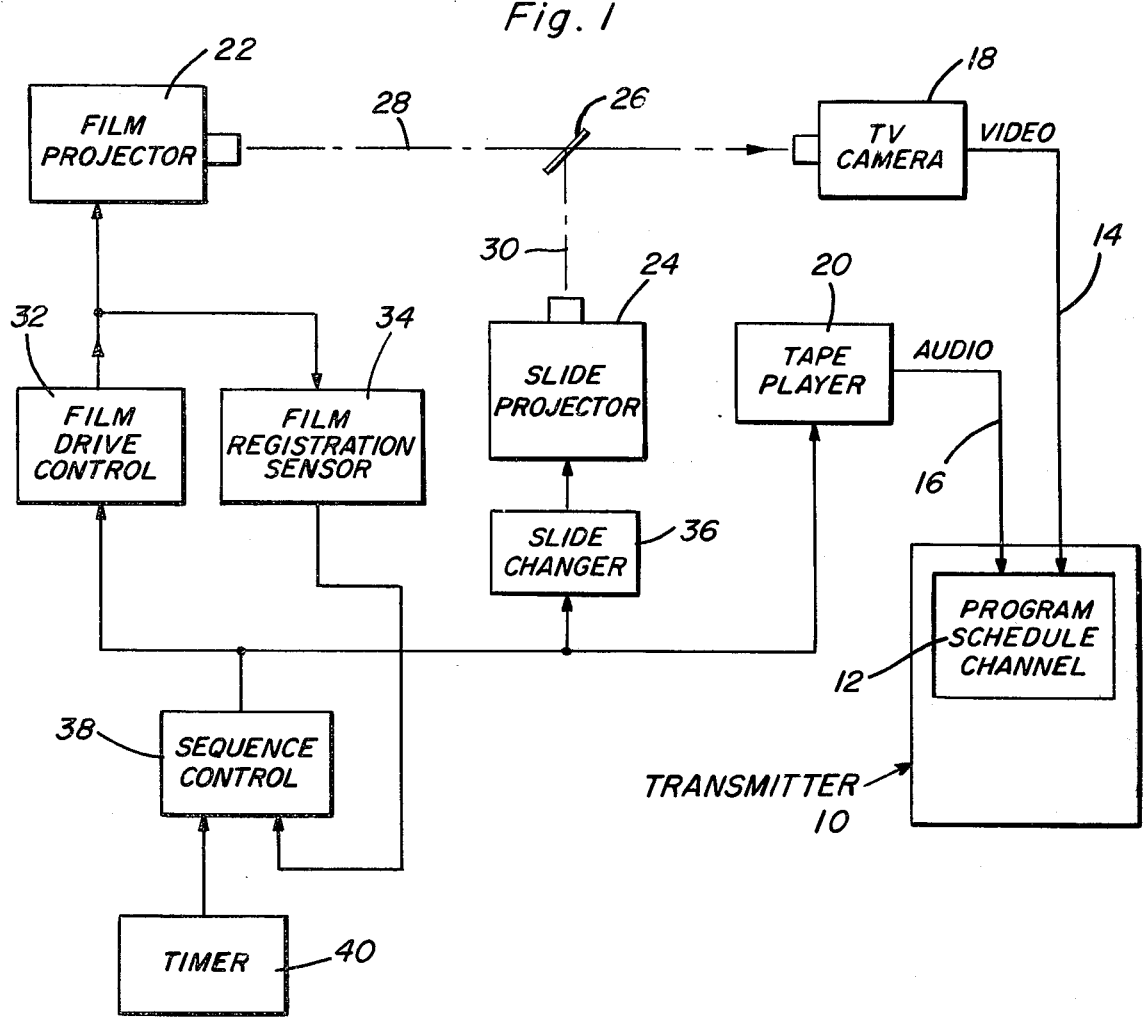
FIG. 1 is a schematic block diagram illustrating the system of the present invention.

Referring now to the drawings in detail, FIG. 1 diagrammatically illustrates the system of the present invention which includes a conventional television transmitter generally denoted by reference numeral 10 through which television program material may be broadcast over a relatively large number of program channels in a cable television system for example. However, in accordance with the present invention, one of the broadcast channels diagrammatically denoted by reference numeral 12 is set aside for the broadcast of program schedule information. Accordingly, any receiver within the television broadcast zone of the transmitter 10 may be tuned to this particular information channel in order to receive program schedule information from which a judgment may be made as to the subsequent selection of a broadcast channel.

Video and audio modulating signals are fed to transmitter 10 for broadcast over the information channel 12 by video and audio signal lines 14 and 16 from a conventional television camera 18 and a multi-track, audio tape player 20. The tape player 20 which may be of a suitable, commercially available type, is accordingly loaded with a tape storing a plurality of audio messages which are to be transmitted in proper synchronism with the video signals generated by the television camera 18 in response to a composite image picked up from a display derived from the projection of images from a film projector 22 and a slide projector 24. The images respectively projected by the projectors 22 and 24 are combined by a two way mirror 26 positioned at a 45 degree angle to the intersection of the right angle optical axes 28 and 30 associated with the projectors 22 and 24 respectively.

Movement of the film associated with projector 22 is controlled by a film drive control assembly 32 in order to displace the film in a forward and reverse direction and cause it to stop at proper positions for projection of images from the frames on the film as detected by a film registration sensor 34. Synchronized movement in forward and reverse directions of the slides associated with the slide projector 24 on the other hand is controlled through a slide changer 36. Operation of the film drive control assembly 32, the slide changer 36 and the tape player 20 in synchronized relationship to each other, is effected under control of a sequence controller 38 receiving control signals from the film registration sensor 34. Also connected to the sequence controller 38, is a timer assembly 40 by means of which unidirectional advancement of the film and slides is effected at the end of each regular program period of one half hour for example.

Figure 6:
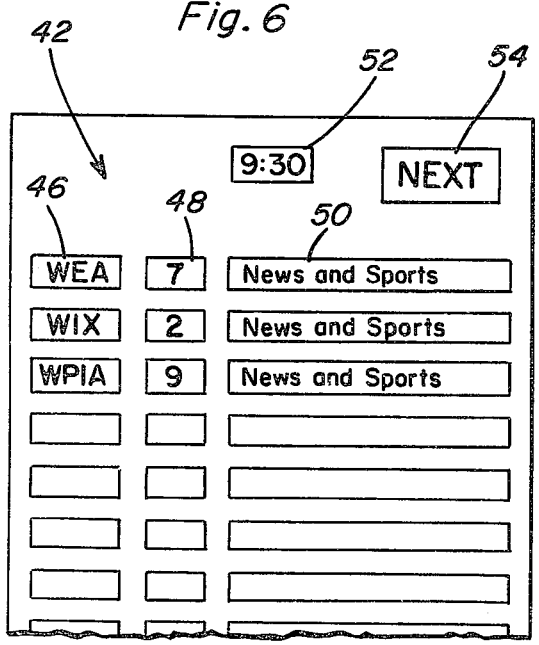
FIG. 6 is a typical layout of visual information displayed in accordance with the present invention during one phase of operation.
Figure 7:
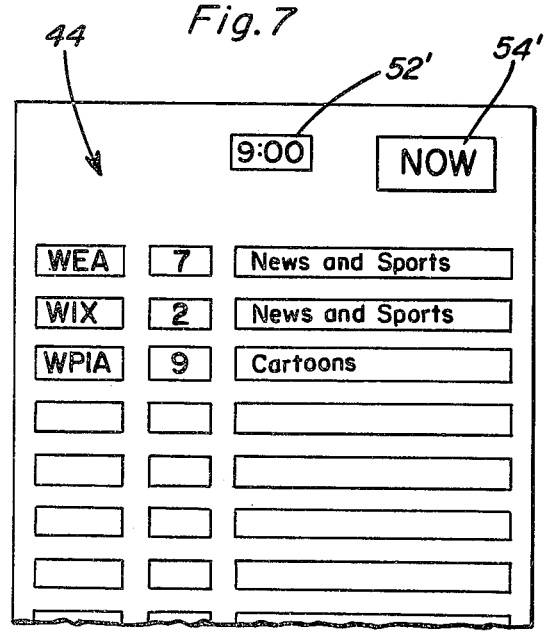
FIG. 7 is a layout of visual information displayed during another phase of operation.

During each program period, visual program schedule information will be displayed and transmitted over the information channel 12 to receivers within the broadcast region for the transmitter 10. This visual information will alternate between two types of displays 42 and 44 as respectively shown in FIGS. 6 and 7. The display 42 as shown in FIG. 6 includes a program schedule consisting of a listing of program channels in terms of their letters 46 and numbers 48 positioned alongside of or in alignment with the title 50 of the particular program which is to be broadcast during the next regular program period. The time for the start of the next program period is displayed at 52 while the type of display 42 itself is identified at 54 as "next." Display 44 as illustrated in FIG. 7 may have the same layout arrangement as display 42 but will be differently identified at 54' as "now" with the time information at 52' representing the beginning of the current program period. The program schedule listing itself will of course correspond to the current program material in progress on the various program channels.

Figure 4:
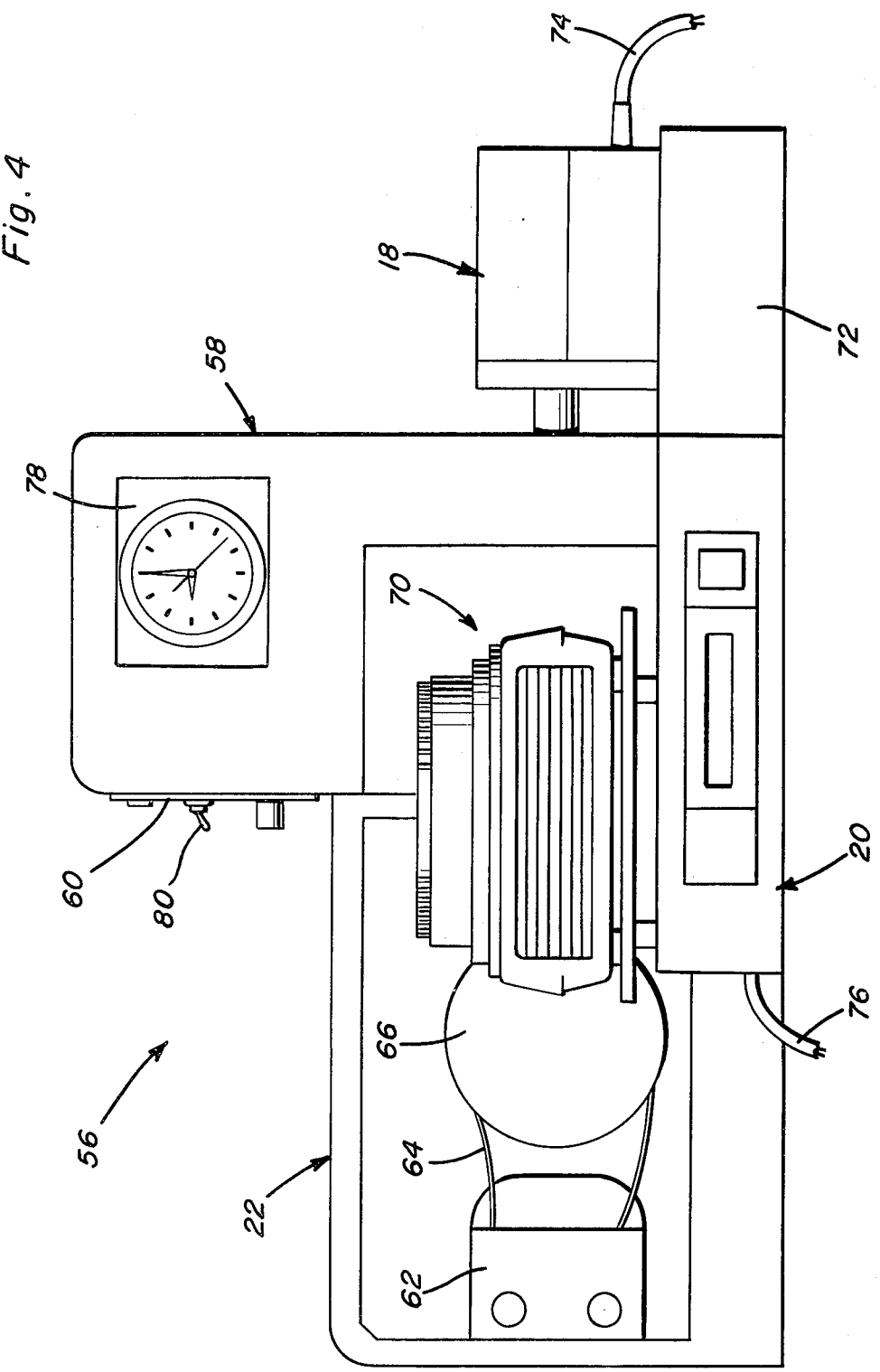
FIG. 4 is a front elevational view of one embodiment of apparatus constructed in accordance with the present invention.
Figure 5:
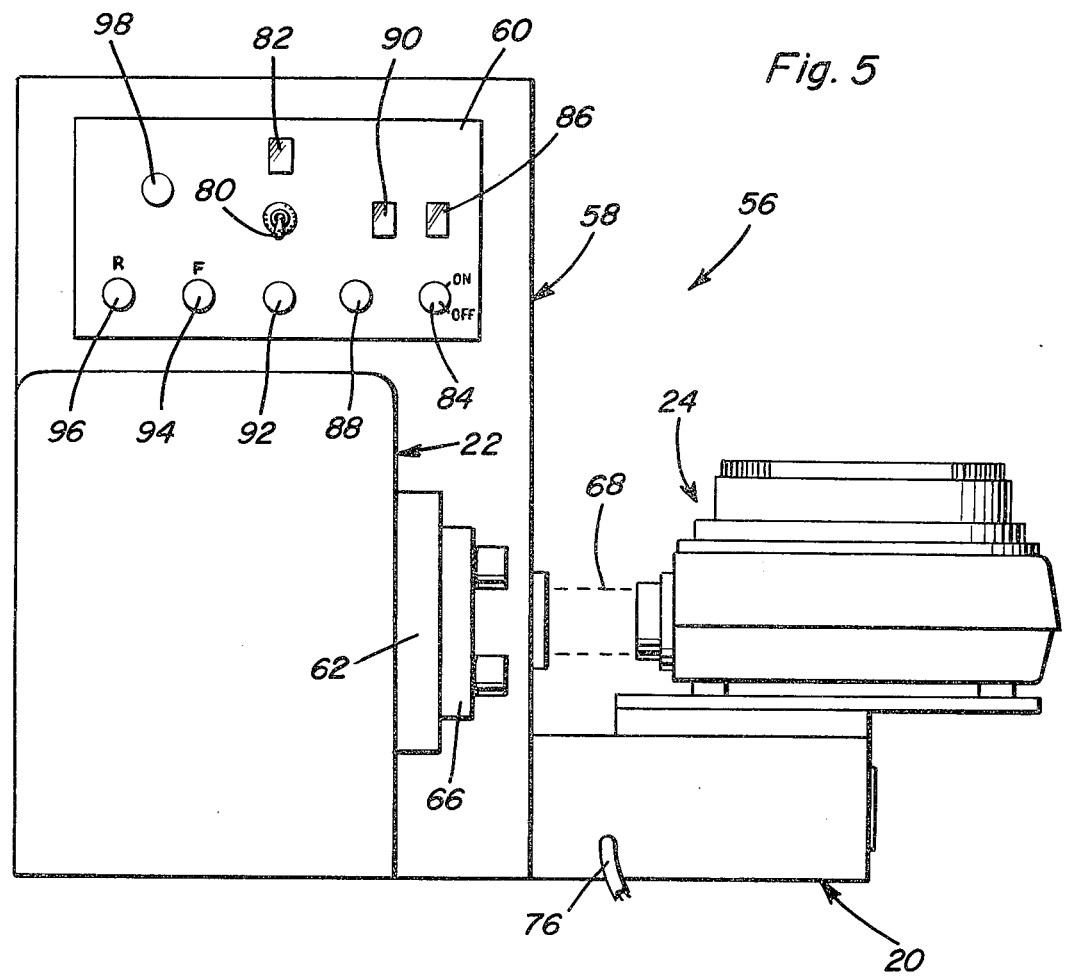
FIG. 5 is a side elevational view of the apparatus shown in FIG. 4.

Typical apparatus for carrying out the invention is illustrated in FIGS. 4 and 5 and is generally denoted by reference numeral 56. The apparatus includes a control box 58 within which the various control circuitry and control components are housed as well as the optical system diagrammatically described in connection with FIG. 1. The film projector 22 is secured to one side of the control box 58 below a control panel 60. A film magazine case 62 is secured to one lateral side of the projector housing enclosing a reel of film from which the film strip 64 is drawn through a housing portion 66 enclosing the projector lamp and shutter operating in a manner to be described in detail hereafter. A projection beam is projected from the housing portion 66 into the control box 58 in perpendicular relationship to a projection beam 68 which extends from slide projector 24 as more clearly seen in FIG. 5. The projection beam 68 thus extends from the slide projector 24 into the control box to produce a composite image with the image projected from the film projector 22, this composite image being picked up by the television camera 18. The television camera is thus aligned with the beam which extends from the projector 22 as shown in FIG. 4. The camera 18 is furthermore supported on a base 72 so as to be vertically aligned both with the beam from the projector 22 and the slide projector 24 which is fixedly mounted on the housing associated with the tape player 20. A video signal is transmitted from the television camera 18 through the cable 74 whereas the audio signal is transmitted from the tape player 20 through cable 76. The slide projector 24 is of a well known commercial type such as the "Carrousel" slide projector manufactured by the Kodak Company. A commercial, eight track audio tape player on the other hand may be utilized for the tape player 20.

For the convenience of the operator, an ordinary clock 78 may be mounted on the control box adjacent to the control panel 60 on which a master power switch 80 is centrally mounted adjacent to an associated pilot lamp 82. Also mounted on the control panel is a sequence control switch 84 having a pilot lamp 86 associated therewith. A mode control switch 88 is located adjacent the sequence control switch 84 in order to directly control operation of the film projector 22 during loading of 16 millimeter film for example. Synchronous operation of the apparatus is indicated by illumination of a synchronous indicator lamp 90. Also for loading of film in the projector 22, a control switch 92 is provided in order to effect continuous film movement. Forward and reverse movement of the slide changer associated with the slide projector 24 may on the other hand be selectively controlled by the operator through the forward and reverse control buttons 94 and 96. Finally, the control panel is also provided with an option selector switch 98 by means of which either one or two displays may be projected between slide changing operations of the slide projector 24 in order to present a complete program schedule. This option selector switch 98 and associated circuitry thus provides an expansion capability for the apparatus in order to accommodate an increased number of program channels.

Figure 2:
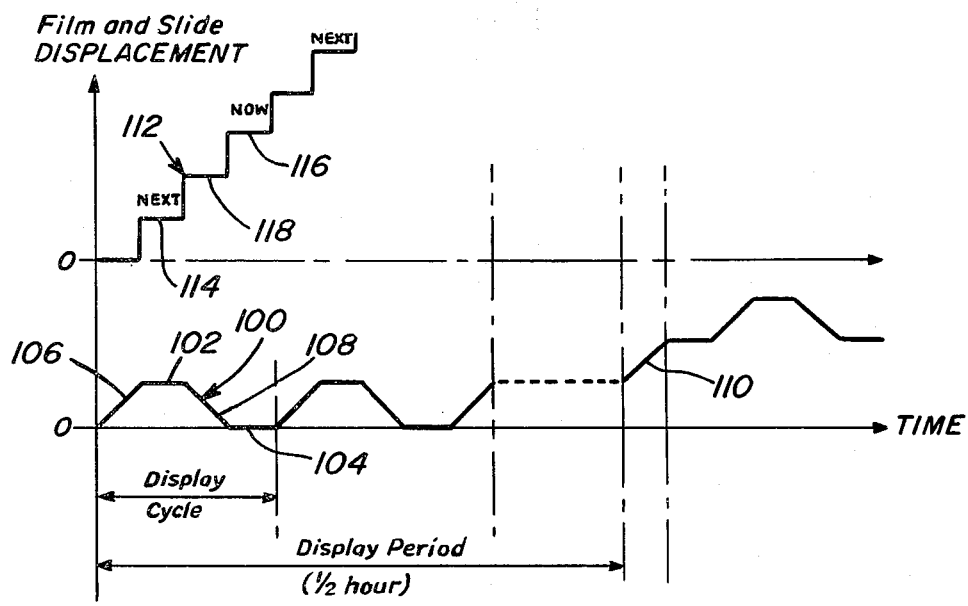
FIG. 2 is a graphical illustration of the timed operational relationships.

The apparatus operates in such a manner as to produce at least two program schedule displays during each half hour display period corresponding to the displays 42 and 44 as illustrated in FIGS. 7 and 8. The composite image projected by the projectors 22 and 24 will thus alternately produce displays 42 and 44 for viewing by the public for intervals of 20 seconds during a display cycle which is repeated until the end of the half hour display period at which time the content of both displays 42 and 44 is changed by unidirectional advancement of the film in the film projector 22 and advancement of the slides in the slide projector 24. FIG. 2 graphically illustrates movement of the film by curve 100. As indicated in FIG. 2, the film curve 100 has a cyclic characteristic with horizontal portions 102 and 104 respectively representing stationary periods in the movement of the film during which the program schedule images are displayed. Thus, during each display cycle, the film is advanced as indicated by curve portion 106 in order to operatively position a frame on the film for producing the display 42 for the 20 second interval associated with the horizontal portion 102 of the curve followed by reverse movement of the film along curve portion 108 to the second stationary interval 104 during which the other display 44 is produced. This display cycle is repeated until the end of the display period when the film is advanced in one direction as indicated by the curve portion 110 in order to begin another display period of a cyclically repeating nature. The foregoing forward and reverse movements of the film as depicted by curve 100 in FIG. 2, occurs in synchronism with forward and reverse movement of the slides in the slide projector so that during the stationary film intervals depicted by curve portions 102 and 104 of the film curve 100, opaque masking slides projecting light images of the words "next" and "now" with time information will be superimposed on the images produced by the film frames to form the composite image displays 42 and 44 as aforementioned. This is depicted by the slide movement curve 112 in FIG. 2 which is also of a cyclically repeating nature including the horizontal interval portions 114 and 116 which are synchronized with the horizontal interval portions 102 and 104 of curve 100. As also indicated by the slide displacement curve 112, intermediate slides are optically positioned for projection of visual material along horizontal curve portions 118 during movement of the film along curve portions 106 and 108. During these intervals, the slide projector may project advertising material from transparent slides while the projection of images from the film projector 22 is blocked by a shutter as will be explained hereafter. During the latter intervals when only visual material is projected from the slide projector 24, the tape player 20 is set into operation in order to reproduce audio messages stored therein corresponding to the visual material projected. Thus, as graphically depicted in FIG. 2, the slide changer associated with the slide projector will advance the slides that are optically positioned for projection of images in a cyclic manner until the end of a display period at which time the slide projector is forwardly advanced in order to change the time information and the advertising material.

Figure 3:
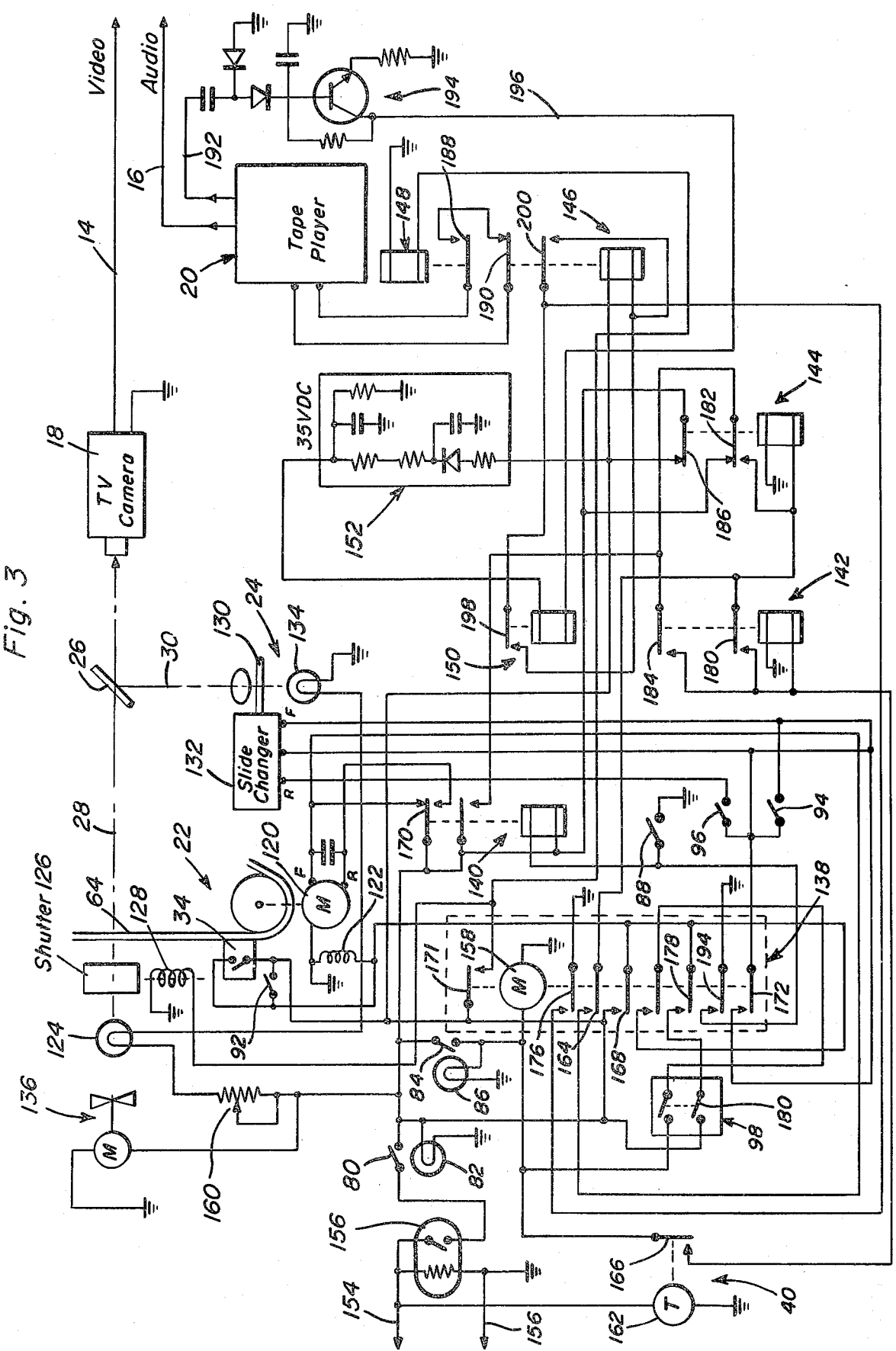
FIG. 3 is an electrical circuit diagram corresponding to the system of the present invention.

The control system operatively interrelating the aforementioned components of the apparatus is illustrated in FIG. 3 which also shows the various interconnected components of the projectors 22 and 24 such as the film drive motor 120 associated with the film projector 22 for movement of the film in forward and reverse directions. A brake release coil 122 is associated with the drive motor. Images are projected from the film 64 by illumination of the projector lamp 124. As aforementioned, images projected by the film projector 22 are blocked during movement of the film by means of a shutter 126 which is retracted while the film is stationary by means of a shutter control solenoid 128. Slides 130 on the other hand are moved into position from a slide magazine by means of a slide changer 132 as diagrammed in FIG. 3. Images are projected from the slides by means of a projection lamp 134 associated with the slide projector 24 and connected in series with the projection lamp 124 associated with the film projector 22. A motor driven cooling fan 136 may be associated with the film projector. As will be explained hereafter, movement of the film is stopped when a frame thereon is operatively aligned under control of the film registration sensor 34. Thus, movement of the film is interrupted by the sensor 34. In order to effect continuous movement of the film for loading purposes as aforementioned, the switch 92 connected in parallel with the sensor switch 34, is held closed by the operator. Synchronized movements of the film 64 and changing of the slides 130 is controlled by automatic cycling means in the form of a cyclic sequence controller assembly generally referred to by reference numeral 138 which may be of the motor driven cam type such as the "Programming Cam Timer," Series RC, Multi-Cam Recycling Timer manufactured by Industrial Timer Corporation, and covered in U.S. Pat. No. 2,776,009. The sequence controller assembly 138 operates in conjunction with various relays including the mode control relay 140 that is energized under control of the sequence controller 138 and upon closing of the mode control switch 88. The mode control relay 140 together with the sequence controller 138 will control energization of the film drive motor 120 in a forward or reverse direction as well as to operate the brake release solenoid 122. Also, the sequence controller controls operation of the slide changer 132 associated with the slide projector 24. This automatic operation may be by-passed by closing of the forward and reverse slide changing switches 94 and 96 for slide loading or unloading purposes as aforementioned.

Cyclic operation is repeated as aforementioned during the program period and upon completion of said period, a unidirectional change in movement of the film and slides is effected under control of the timer assembly 40 which is operatively connected for this purpose to the sequence controller 138 through the option selector switch assembly 98. Synchronization between operation of the projectors and between the projectors and the tape player 20 is assured by means of the relay assemblies 142 and 144. Proper operation of the tape player in synchronization with the other operational sequences is assured by relay assemblies 146 and 148 while the operating condition of the tape player is controlled by the relay assembly 150. Proper rectified voltage for the tape player is supplied by a voltage converter 152, the other components of the control system being energized from a conventional AC source through power line 154 and ground line 156.

With continued reference to FIG. 3, operation of the program schedule display system will become apparent. Upon closing of the master switch 80, current is conducted from the power line 154 following a warm-up period terminated by closing of the thermal delay switch 156 to the indicator lamp 82 and the sequence controller switch 84 through which the sequence controlling motor 158 is energized upon closing of the switch 84. Thus, when the sequence controller 138 is in operation, the indicator lamp 86 is illuminated. Also, current is conducted through the adjustable rheostat 160 to the projector lamps 124 and 134. While automatic cycling operation of the system requires closing of the switches 80 and 84, operation of the timer assembly is continuous. Toward that end, the timer motor 162 is directly connected to the power line 154 in order to momentarily close the timer switch 166 at the end of each program period.

After a 20 second interval during which images from both projectors are projected and combined for pickup by the television camera 18, the sequence controlling motor 158 closes a film advance switch 168 thereby energizing the brake release coil 122 to release the drive motor 120 for advancement of the film 64 in either direction. The film drive motor 120 as shown in FIG. 3 is energized through the normally closed contact of relay switch 170 for drive of the film in a forward direction as long as the mode control relay 140 is deenergized. Thus, upon closing of the switch 168, the film will be advanced. The film frame comes out of registration with the sensor 34 resulting in the closure of its switch thereby maintaining the brake release coil 122 energized. When the next frame of the film is operatively aligned with the lens of the film projector, the sensor switch 34 opens once again to deenergize the brake release coil 122 causing the film to stop. During movement of the film, the sequence controlling motor 158 closes switch 171 so as to energize the shutter solenoid 128 thereby blocking projection of any image from the film during movement of the film. Also, when movement of the film 64 is initiated, the sequence controlling motor 158 closes switch 172 to thereby complete a forward drive circuit for the slide changer 132. Thus, the film 64 and the slides 130 are advanced in a forward direction. The advancement of the slides is of course effected at a much more rapid rate than the film so that during the film movement interval, an intermediate or additional transparent slide is inserted in order to present the advertising material. When movement of the film has stopped at the next frame, another opaque masking slide will be positioned for projection of the time information. The foregoing sequence of operations are then repeated after a 20 second delay built into the sequence controller 138. The next operational sequence however, effects reverse movement of the film by closing of the switch 174 causing energization of the mode relay 140 to actuate the relay switch 170 thereby transferring current from the forward terminal of the drive motor 120 to the reverse terminal.

If the option selector switch assembly 98 is closed, after a 10 second interval during which the film 64 is stationary, closing of the switch 178 by the sequence control motor 158 will conduct current from the option switch section 180 to the brake release coil 122 for releasing the drive motor so that it may advance the film in one of the other direction an additional frame which is to be viewed during the remainder of the 20 second interval during which a particular program schedule is to be presented.

Upon completion of the program period, closing of the timer switch 166 energizes the relay coil of relay assembly 142 to thereby connect this timer switch through normally open relay switch 180 to the relay coil of an overruling relay assembly 144 for energization thereof. Relay switch 182 is thereby actuated to complete a relay holding circuit for relay 142 through normally open relay switch 184 and at the same time opens relay switch 186 in order to disconnect the mode relay coil from the power supply. Energization of the mode relay 140 is thereby prevented in order to insure that the drive motor will advance the film in a forward direction only by directionally overruling operation of the drive in a reverse mode. Power for operating the drive motor 120 is then supplied through relay switch 180 and switch 164 in the sequence controller to the forward terminal of motor 120.

Whenever the strip film 64 is moving and the shutter 126 is closed to block projection of any image therefrom, the relay coil of relay 148 is energized simultaneously with the shutter operating solenoid 128 to which it is connected thereby closing its normally open relay switch 188 completing an energizing circuit for initiating operation of the tape player 20 through the normally closed relay switch 190 associated with relay assembly 146. An audio output is thereby produced from the tape player 120 applied as a modulating signal to the transmitter through line 16 and through line 192 to a signal pickup circuit 194 from which a signal is generated and transmitted through line 196 to the relay 150 thereby closing its normally open relay switch 198. Closing of relay switch 198 will connect the switch 176 in the sequence controller 138 to the relay coil of relay 146 for timely energization thereof. When energized, relay 146 opens relay switch 190 to interrupt operation of the tape player and closes its relay holding switch 200 so as to remain energized until switch 176 is opened by the sequence controller 138. Cue signals on the tape will accordingly synchronize operation of the tape player with the periods during which the film strip is moving and visual information is being projected solely from the slide projector 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in a regional television broadcast zone wherein a television receiver may be selectively tuned to a plurality of broadcast channels over which broadcast programs are transmitted, a system for displaying program schedules, comprising a transmitter broadcasting over one of said channels, image reproducing signal means connected to the transmitter for feeding video signals thereto, at least two optical projectors, optical record means associated with said projectors for respectively storing visual program schedule and time displays, image combining means for transmitting composite images of said schedule and time displays to the image reproducing signal means from the projectors, sequence control means connected to the projectors for synchronized movement of the optical record means in opposite directions to cyclically project said composite images, and timer means connected to the sequence control means for periodically effecting a change in the composite images transmitted to the image reproducing signal means whereby timely program schedule information broadcast over said one of the channels may be viewed on said television receiver at any time.

2. In combination with a film projector, a slide projector and an optical system for projecting a composite image from frames of a film and slides respectively advanced by a film drive mechanism and a slide changer associated with the projectors, cycling means connected to the film drive mechanism for displacement of the film amounts in opposite directions to alternately project at least two images, synchronizing means connecting the cycling means to the slide changer for displacement of the slides simultaneously with and more rapidly than said displacement of the film, shutter means connected to the cycling means for preventing projection of the images from the film frames during movement thereof, brake means for holding the film drive mechanism stationary during display time intervals between said displacements thereof in opposite directions, timer means for generating a signal upon elapse of a display period of predetermined duration, directional overrule means connected to the cycling means for preventing displacement of the film frames in one direction in response to said signal to effect unidirectional advancement of the film and the slides upon completion of said display period.

3. For use in a regional television broadcast zone wherein a television receiver may be selectively tuned to a plurality of broadcast channels over which broadcast programs are transmitted, a system for displaying program schedules, comprising a transmitter broadcasting over one of said channels, image reproducing signal means connected to the transmitter for feeding video signals thereto, at least two optical projectors, optical record means associated with said projectors for respectively storing visual program schedule and time displays, image combining means for transmitting a composite image of said schedule and time displays to the image reproducing signal means from the projectors, sequence control means connected to the projectors for synchronized movement of the optical record means, and timer means connected to the sequence control means for periodically effecting a change in the composite image transmitted to the image reproducing signal means whereby timely program schedule information broadcast over said one of the channels may be viewed on said television receiver at any time, said optical record means including a film having frames thereon from which said program schedule displays are projected by one of the projectors and a plurality of slides from which the time displays are projected by the other of the projectors.

4. The combination of claim 3 wherein the optical record means further includes additional transparent slides interposed between the first mentioned slides, from which advertising displays are projected during displacement of the film.

5. The combination of claim 4 including audio player means connected to the sequence control means for generating an audio message signal during projection of the advertising displays from the transparent slides.

6. The combination of claim 3 including drive control means connected to one of the projectors for slowly displacing the film one frame at a time in opposite directions in response to signals from the sequence control means and slide changing means connected to the other of the projectors for more rapidly displacing the slides in response to said signals.

7. The combination of claim 6 including shutter means connected to the sequence control means for blocking projection of images from the film during said displacement thereof.

8. The combination of claim 6 wherein the sequence control means includes automatic cycling means connected to the drive control means for intermittently effecting displacement of the film in opposite directions during a program period of predetermined duration and alternate projection of images of at least two program schedules, time synchronizing means connected to the slide changing means for rapidly advancing the slides in opposite directions simultaneously with said displacement of the film, sensor means mounted on said one of the projectors for detecting registration of the film frames at an operative position from which images are projected, and means connecting the sensor means to the cycling means for stopping displacement of the film during image displaying intervals in response to registration of the film frames at said operative position.

9. The combination of claim 8 including option selector means connected to the cycling means for effecting displacement of the film at least two times before the first mentioned slides are advanced.

10. The combination of claim 8 including directional overrule means connected by the timer means to the cycling means for unidirectionally advancing the film upon completion of the program period.

11. The combination of claim 8 wherein the optical record means further includes additional transparent slides interposed between the first mentioned slides, from which advertising displays are projected during displacement of the film.

12. The combination of claim 11 including shutter means connected to the sequence control means for blocking projection of images from the film during said displacement thereof.

13. The combination of claim 12 including audio player means connected to the sequence control means for generating an audio message signal during projection of the advertising displays from the transparent slides.

14. The combination of claim 13 including option selector means connected to the cycling means for effecting displacement of the film at least two times before the first mentioned slides are advanced.

15. The combination of claim 14 including further includes directional overrule means connected by the timer means to the cycling means for unidirectionally advancing the film upon completion of the program period.

* * * * *